(12) United States Patent
Mach

(10) Patent No.: US 9,370,961 B2
(45) Date of Patent: Jun. 21, 2016

(54) ASSISTED OPENING COMPACT NOVELTY UTENSIL

(71) Applicant: James John Mach, Shakopee, MN (US)

(72) Inventor: James John Mach, Shakopee, MN (US)

( * ) Notice: Subject to any disclaimer, the term of this patent is extended or adjusted under 35 U.S.C. 154(b) by 186 days.

(21) Appl. No.: 13/974,465

(22) Filed: Aug. 23, 2013

(65) Prior Publication Data

US 2014/0064820 A1    Mar. 6, 2014

Related U.S. Application Data

(60) Provisional application No. 61/692,964, filed on Aug. 24, 2012.

(51) Int. Cl.

| | | |
|---|---|---|
| B43K 23/00 | (2006.01) |
| B43K 29/18 | (2006.01) |
| G06F 3/033 | (2013.01) |
| A47J 43/28 | (2006.01) |
| B43K 7/12 | (2006.01) |
| B43K 21/00 | (2006.01) |
| B43K 29/10 | (2006.01) |
| B43K 24/02 | (2006.01) |
| B43K 7/03 | (2006.01) |
| B43K 23/08 | (2006.01) |
| B43K 29/007 | (2006.01) |
| B43K 29/02 | (2006.01) |
| B43K 7/00 | (2006.01) |
| G02B 27/20 | (2006.01) |

(52) U.S. Cl.
CPC .............. *B43K 29/10* (2013.01); *B43K 7/005* (2013.01); *B43K 7/03* (2013.01); *B43K 21/00* (2013.01); *B43K 21/006* (2013.01); *B43K 23/08* (2013.01); *B43K 24/02* (2013.01); *B43K 29/007* (2013.01); *B43K 29/02* (2013.01); *G02B 27/20* (2013.01)

(58) Field of Classification Search
CPC ........... E05F 1/12; B43K 21/00; B43K 24/02; B43K 27/02
USPC .......... 16/341, 131, 6, 99, 277, 367; 401/195, 401/52, 258–260; 7/168
See application file for complete search history.

(56) References Cited

U.S. PATENT DOCUMENTS

| | | | | |
|---|---|---|---|---|
| 3,285,228 A * | 11/1966 | Fisher | ............................. | 401/101 |
| 5,697,124 A * | 12/1997 | Jung | ................................ | 16/341 |
| 6,464,419 B1 * | 10/2002 | Chan | ............................... | 401/131 |
| 2009/0142127 A1* | 6/2009 | Glesser et al. | ................. | 401/195 |
| 2010/0212163 A1* | 8/2010 | Liu | .................................... | 30/159 |
| 2010/0313384 A1* | 12/2010 | Nakasone | ........................ | 16/277 |

* cited by examiner

*Primary Examiner* — Mark A Laurenzi
*Assistant Examiner* — Thomas M Abebe
(74) *Attorney, Agent, or Firm* — Vidas Arrett & Steinkraus

(57) ABSTRACT

A compact utensil which has two utility components connected by an assisted opening hinge.

12 Claims, 26 Drawing Sheets

ASSISTED OPENING COMPACT NOVELTY UTENSIL

CROSS-REFERENCE TO RELATED APPLICATIONS

This application claims priority to provisional patent application No. 61/692,964 filed Aug. 24, 2012, the entire contents of which are hereby incorporated by reference.

STATEMENT REGARDING FEDERALLY SPONSORED RESEARCH

Not Applicable

FIELD OF THE INVENTION

The present invention relates to an assisted opening compact novelty utensil. More specifically, the invention relates to a utensil which folds shut into a very compact form, and when a release pin is actuated, the utensil unfolds and is locked open in an in-line position.

BACKGROUND OF THE INVENTION

A utensil which is compact, easy to open and can provide a writing component and a light or eraser component, would be desirable.

BRIEF SUMMARY OF THE INVENTION

Applicant has invented a useful, compact utensil which has two utility components connected by an assisted opening hinge. In one embodiment the assisted opening hinge is a torsion spring, which when actuated, is constructed and arranged to pivot the first and second utility components from a folded closed position to an open in-line position. In other embodiments, the torsion spring may be replaced with a compression spring, a dual torsion spring, a barrel torsion spring, a plastic spring, a wave spring, an extension spring, a Belleville washer, a rubber band, a nylon elastic band spring, elongating springs, or spring steel. The first utility component has an opening or cavity into which the second component folds, to place the utensil in a folded closed position. An actuated locking device holds the utensil in the folded closed position, and when actuated, allows the spring in the assisted opening hinge to open the first and second utility components to the in-line position.

In an embodiment the actuated locking device is comprised of a slotted hollow axle which contains a compression spring which normally forces a release pin lock into a first indent to lock the utensil in the folded closed position, and is constructed and arranged so that when the release pin is depressed, which compresses the compression spring, the release pin lock is moved from the indent, allowing the spring to open the utensil, and when the utensil is in the in-line position, the compression spring moves the release pin lock back into a second indent to lock the utensil into the open position.

In one embodiment the first utility component is a writing utility component and the second utility component is selected from the group consisting of an LED light, a UV blue LED, a laser pointer and an eraser. The writing component is either a pressurized ink cartridge like that of a space pen, standard ink refill, custom ink refill suitable to various markets, or a mechanical pencil. In another embodiment, the second utility component is a combination of both the LED light and the laser pointer.

The spring is selected from the group consisting of a torsion spring, a compression spring, a dual torsion spring, a barrel torsion spring, a plastic spring, a wave spring, an extension spring, a Belleville washer, a rubber band, a nylon band spring, elongating springs, and spring steel.

The cross-section of the first and second utility components is selected from the shape consisting of circular, triangular, rectangular, square, pentagonal and hexagonal.

DETAILED DESCRIPTION OF THE INVENTION

Figure 1:
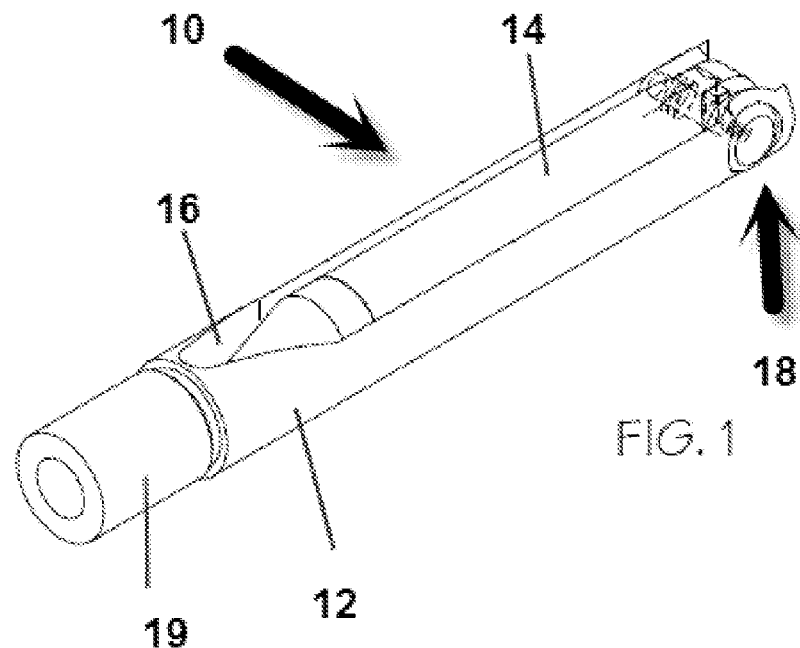
FIG. 1 is a perspective view of an embodiment of the invention, shown in the folded closed position.

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Referring now to FIG. 1, an embodiment of the inventive utensil is shown at 10 in the folded closed position. The first utility body is shown at 12 and the second utility body is shown at 14, which in the folded position folds into cavity 16 in the first utility body. The assisted opening hinge is shown generally at 18. The end 19 of the first utility body in this embodiment is an LED light, which is turned on by rotation of the end 19, as is well known in the art. End 19 holds the entire LED light, including the battery.

Figure 2:
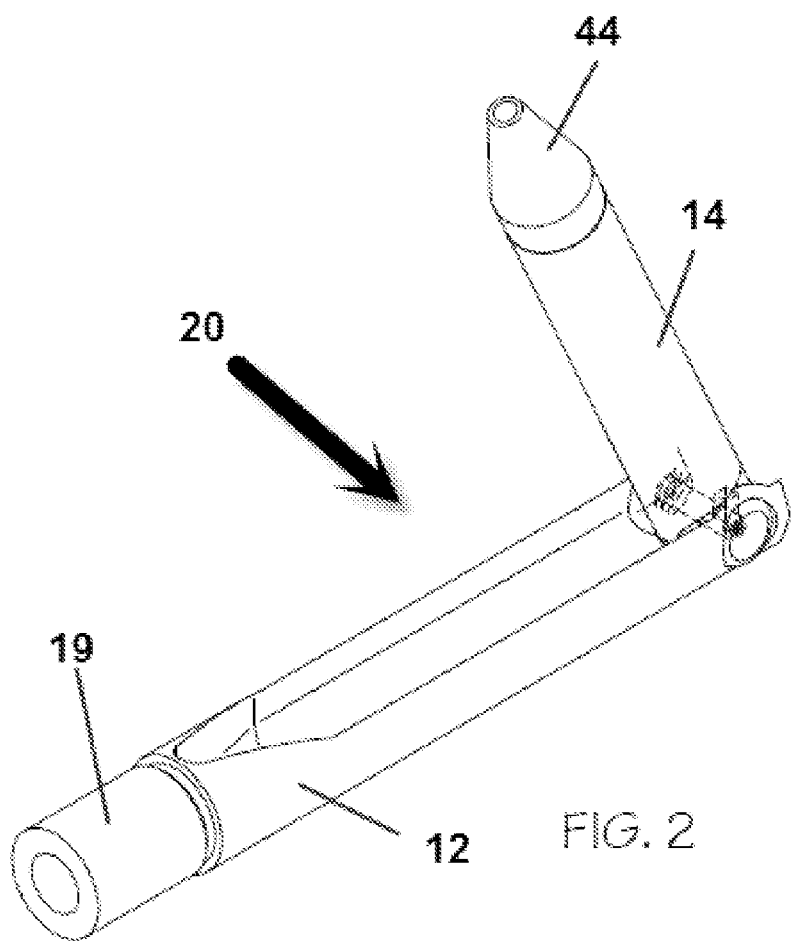
FIG. 2 is a perspective view of an embodiment of the invention, shown in the mid-opened position.

Referring now to FIG. 2, the utensil of FIG. 1 is shown at 20 in the mid-opened position.

Figure 3:
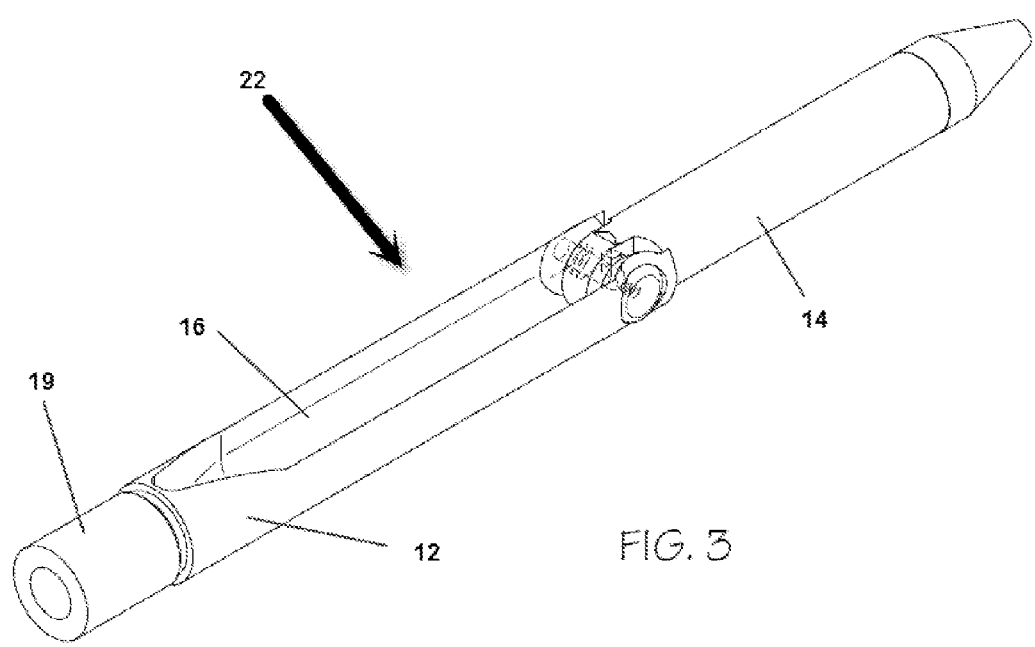
FIG. 3 is a perspective view of an embodiment of the invention, shown in the opened in-line position.

Referring now to FIG. 3, the utensil of FIG. 1 is shown at 22 in the opened in-line position, with the second utility body having rotated from the zero to 180° position.

Figure 7:
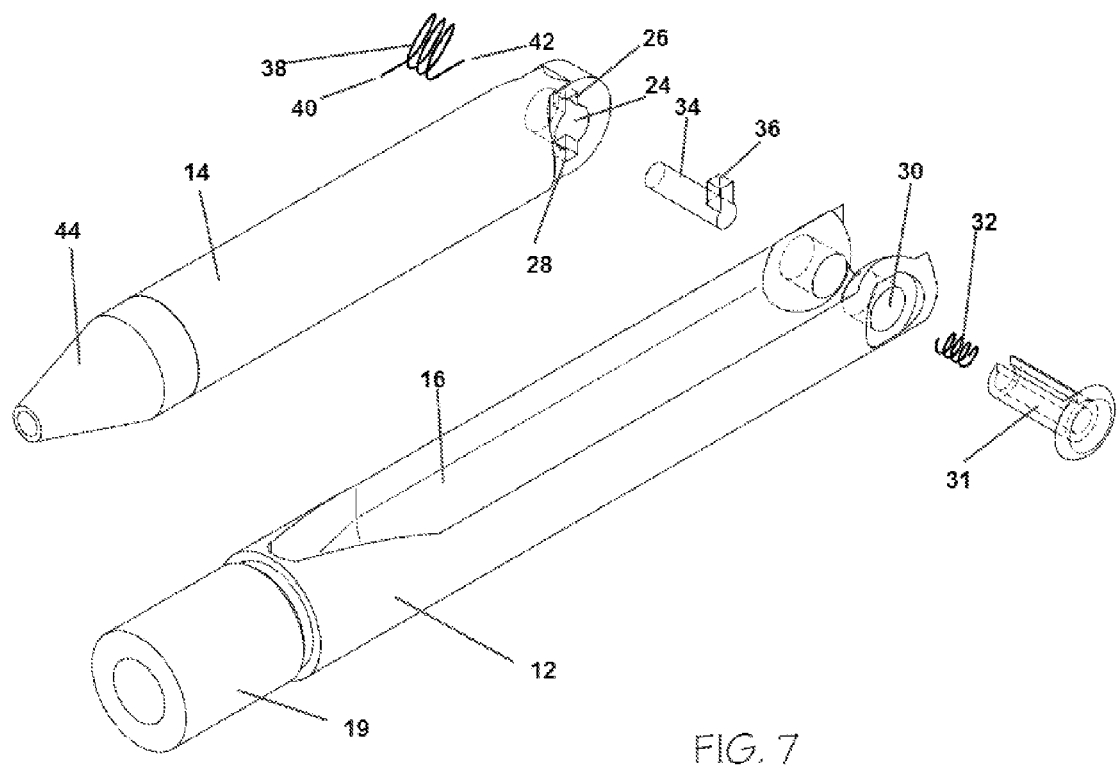
FIG. 7 is an exploded perspective view of the invention, showing the parts.
Figure 8:
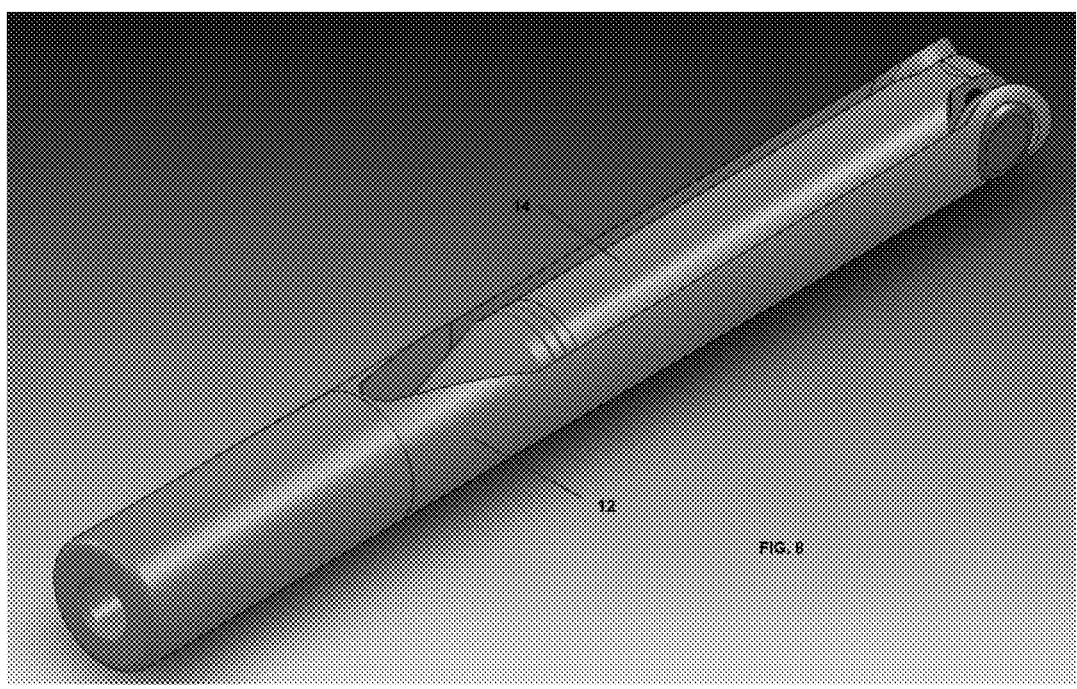
FIG. 8 is a perspective view of an embodiment of the invention, shown in the closed position.
Figure 9:
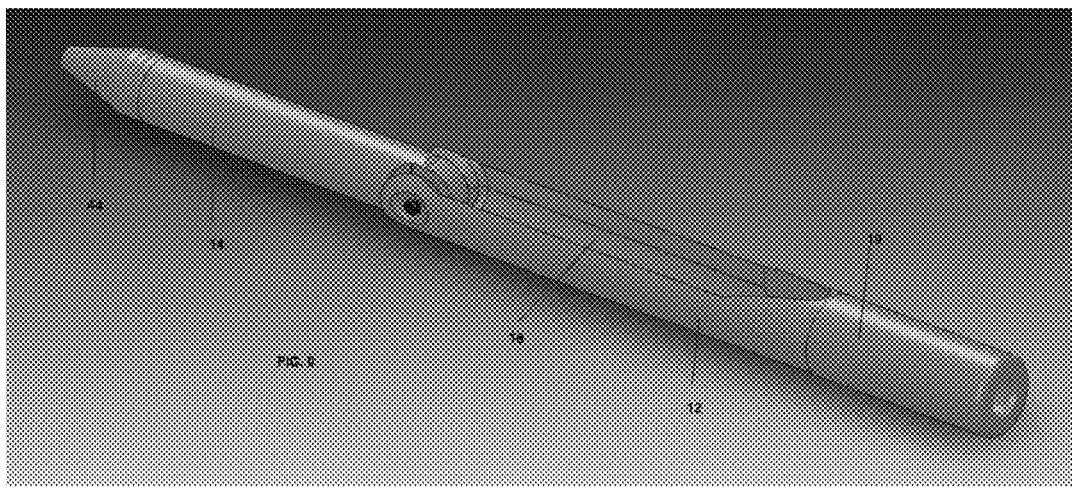
FIG. 9 is a perspective view of an embodiment of the invention in the opened in-line position.
Figure 10:
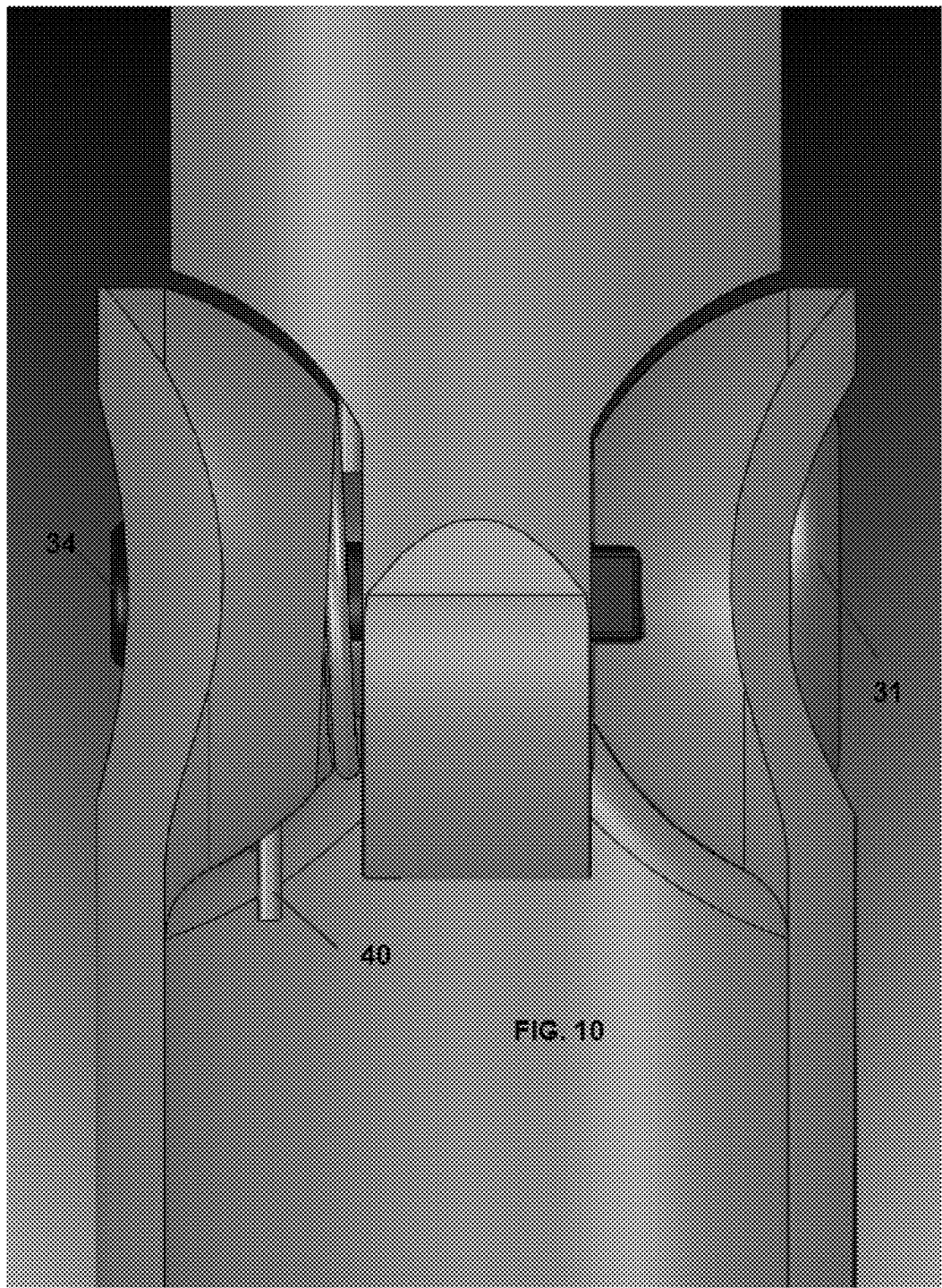
FIG. 10 is a bottom view of the hinge.
Figure 11:
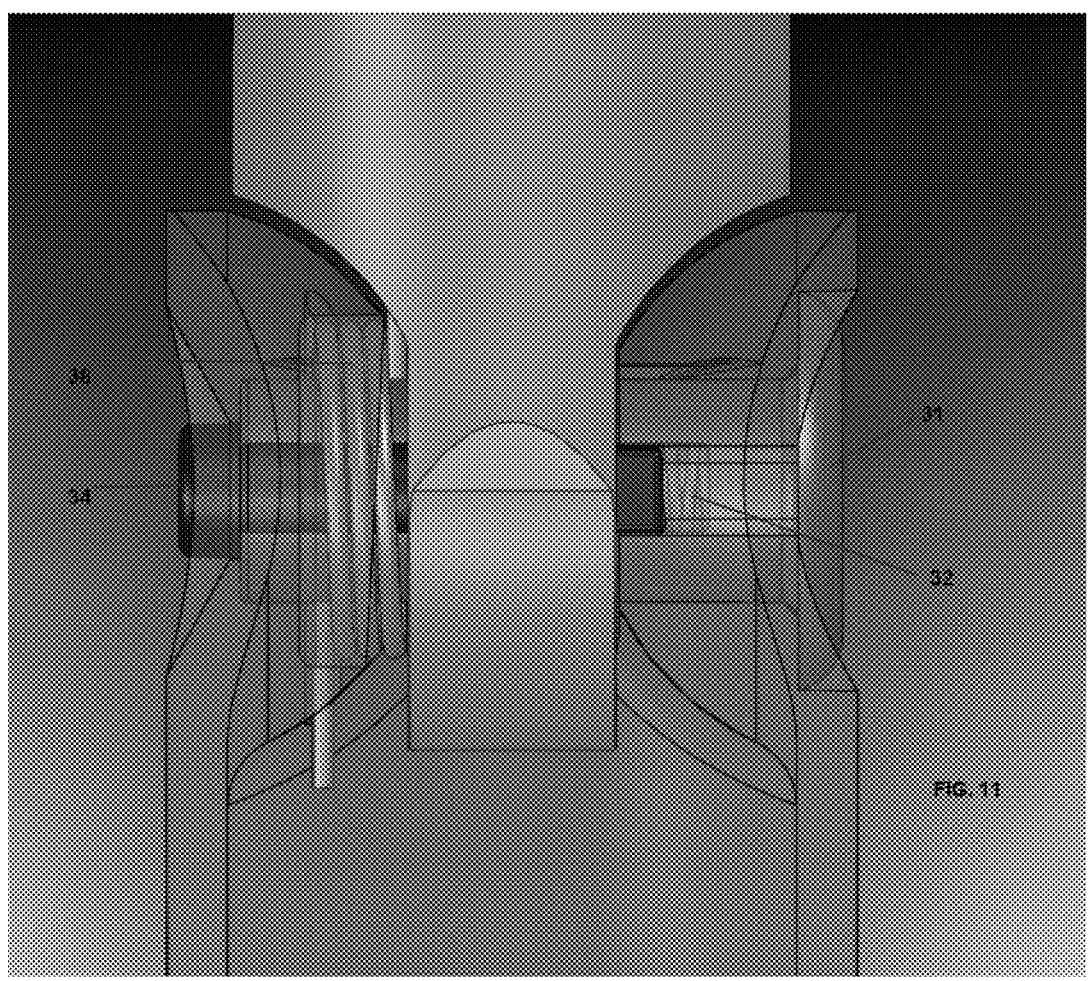
FIG. 11 is a see-through view of the hinge in the open position with the release pin in the un-actuated position.
Figure 12:
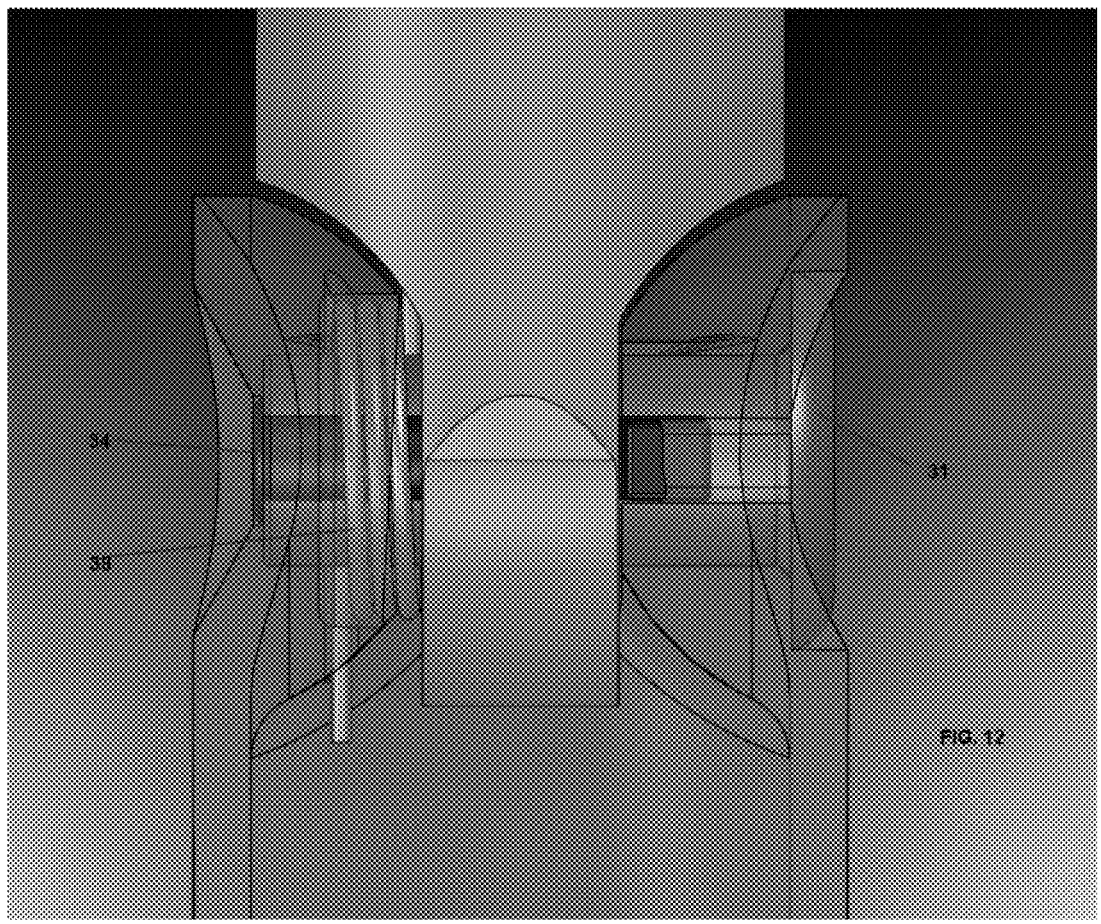
FIG. 12 is see-through view of the hinge in the open position with the release pin in the actuated position.
Figure 13:
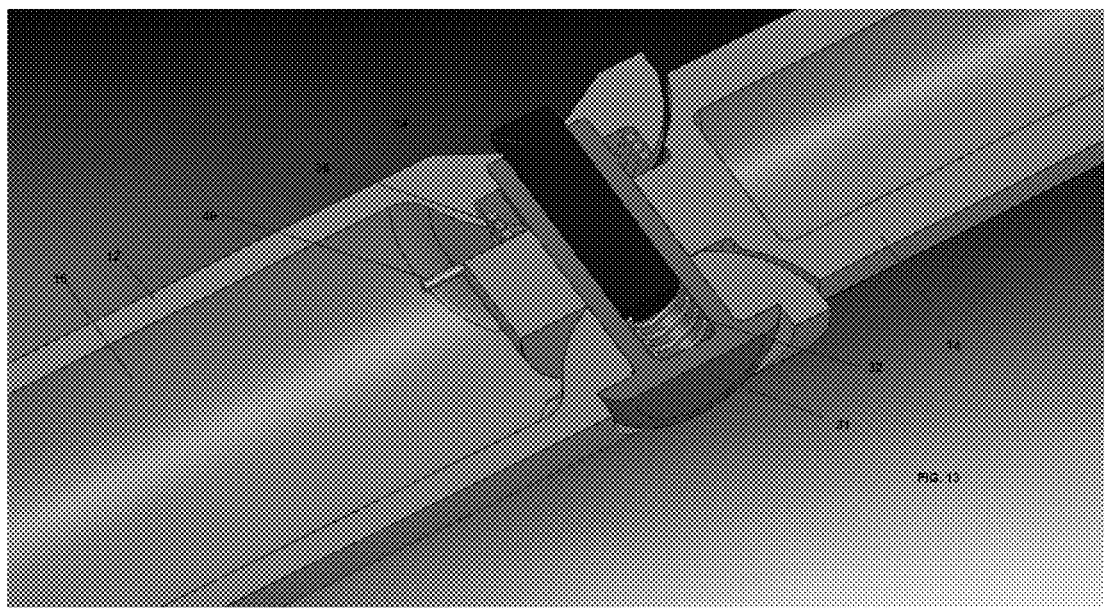
FIG. 13 is a cross-section perspective view of the hinge.
Figure 14:
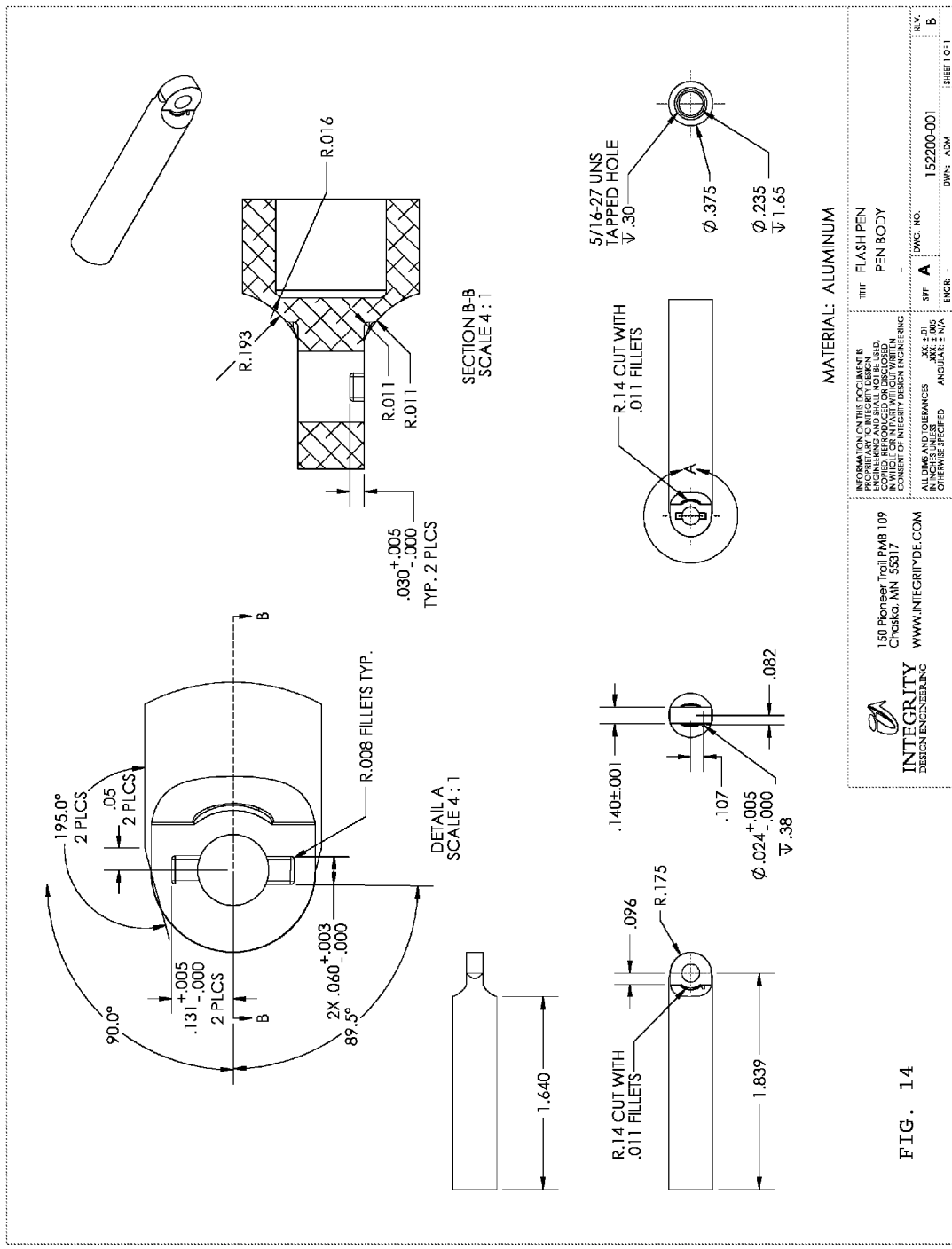
FIG. 14 is an engineering drawing of the pen body (second utility component).
Figure 15:
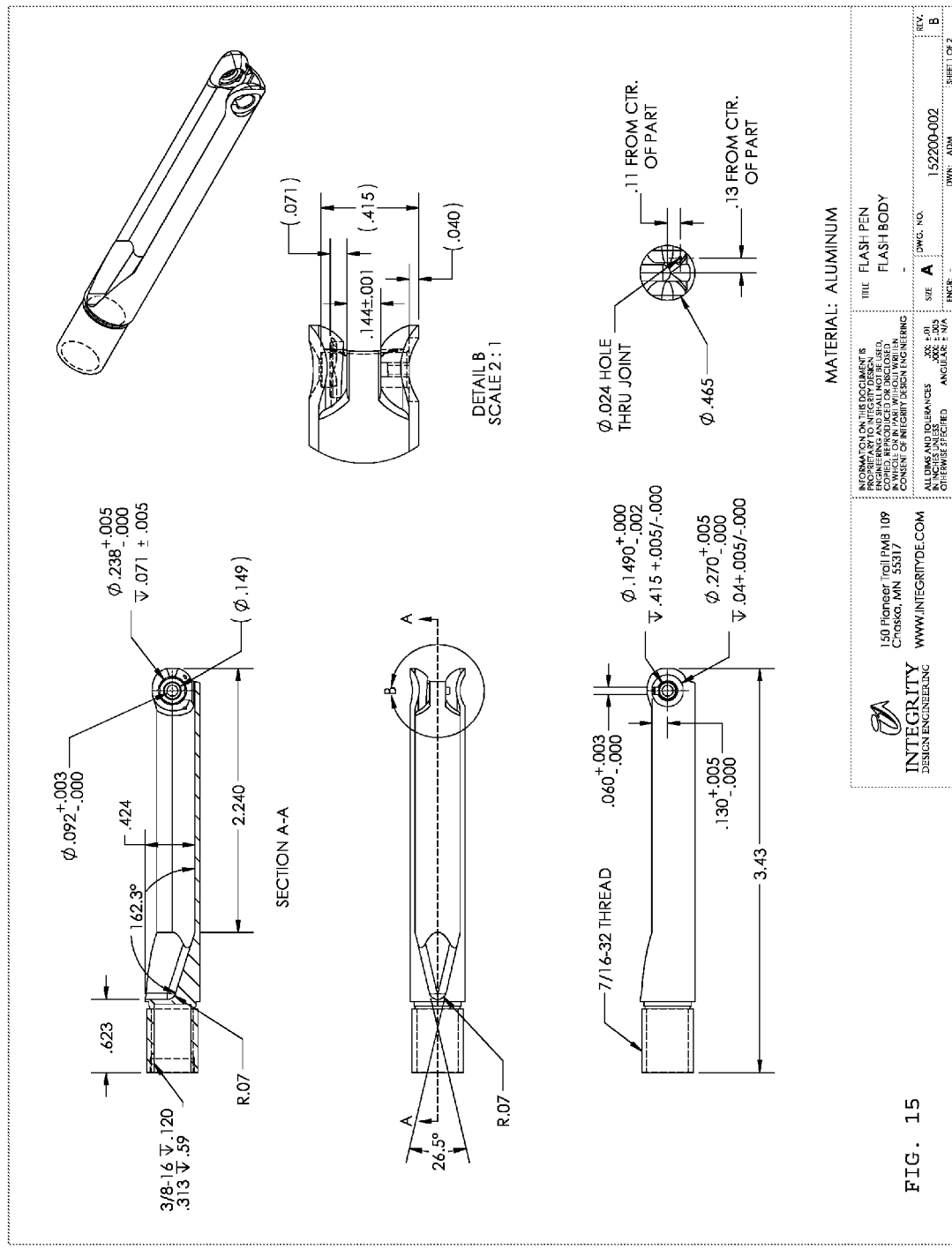
FIG. 15 is an engineering drawing of the flash body (first utility component).
Figure 16:
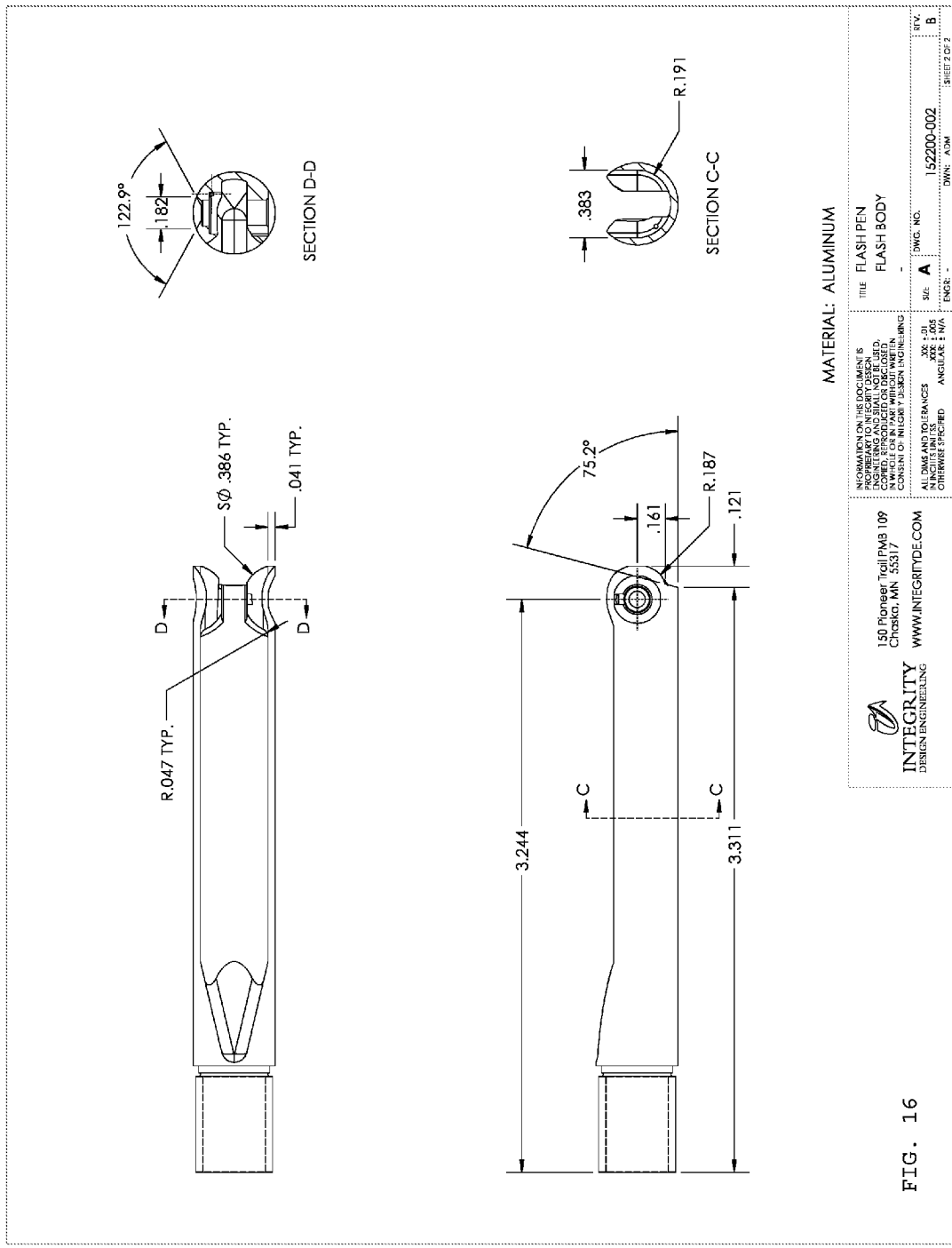
FIG. 16 is a further engineering drawing of the flash body (first utility component).
Figure 17:
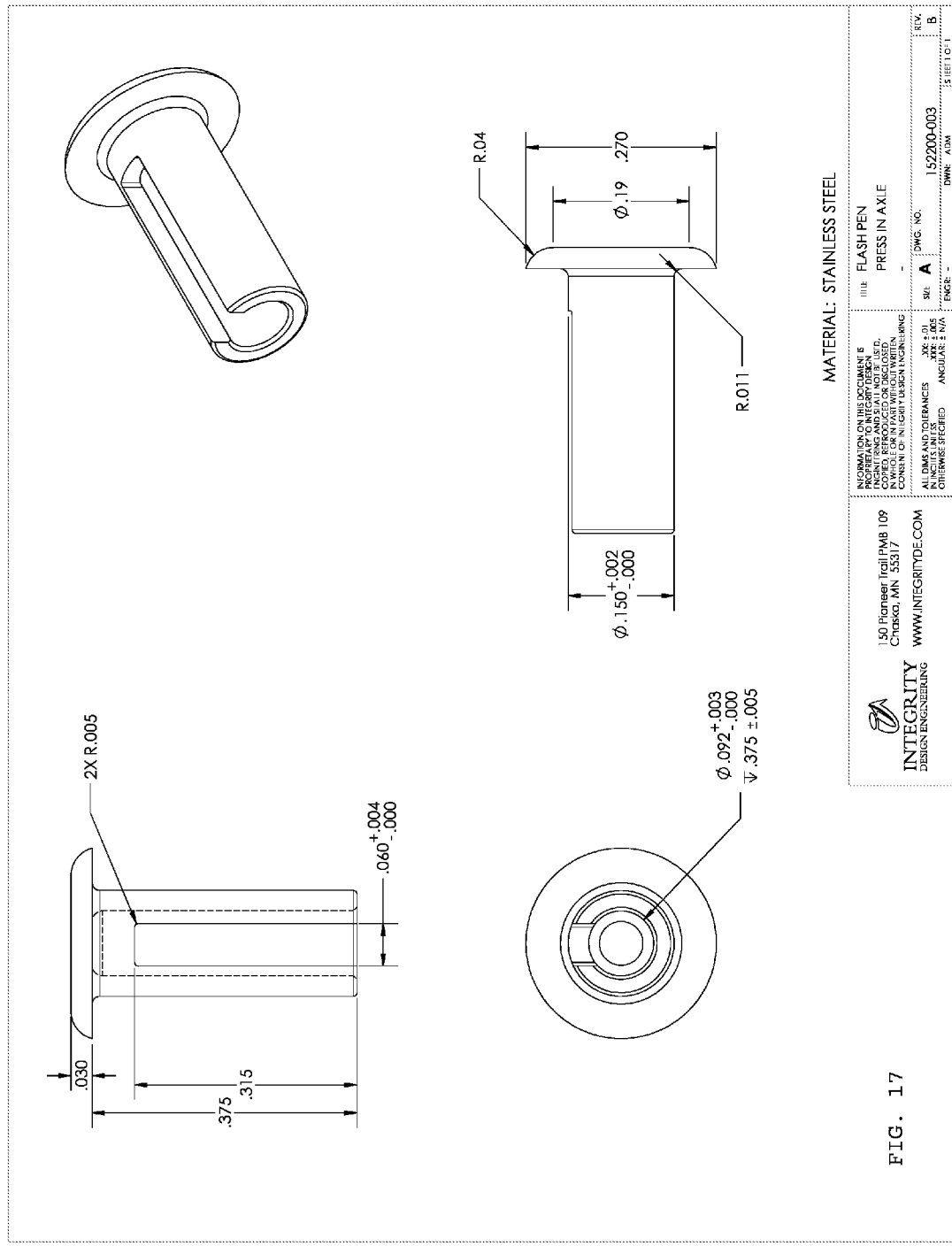
FIG. 17 is an engineering drawing of the press in slotted axle.
Figure 18:
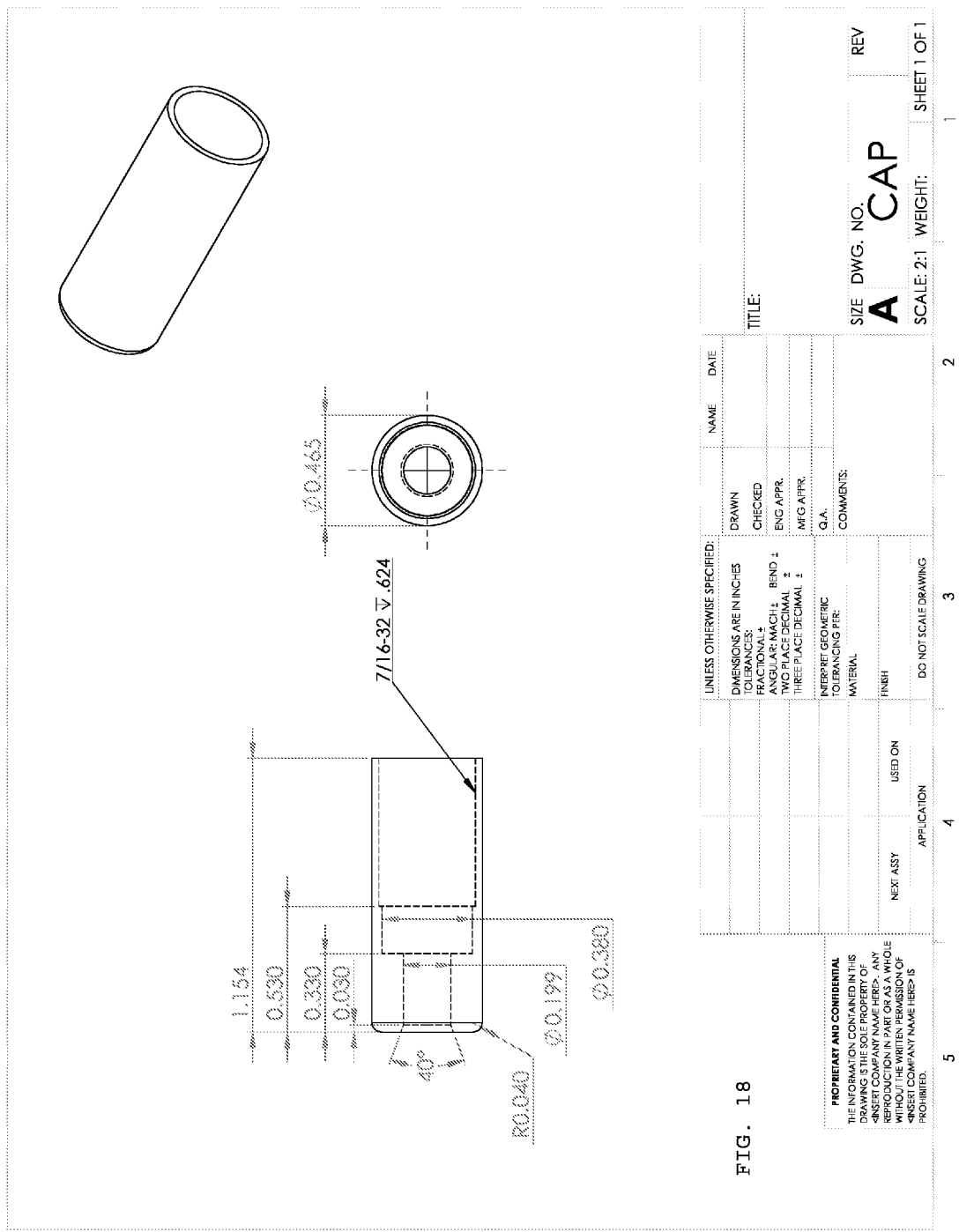
FIG. 18 is an engineering drawing of the cap.
Figure 19:
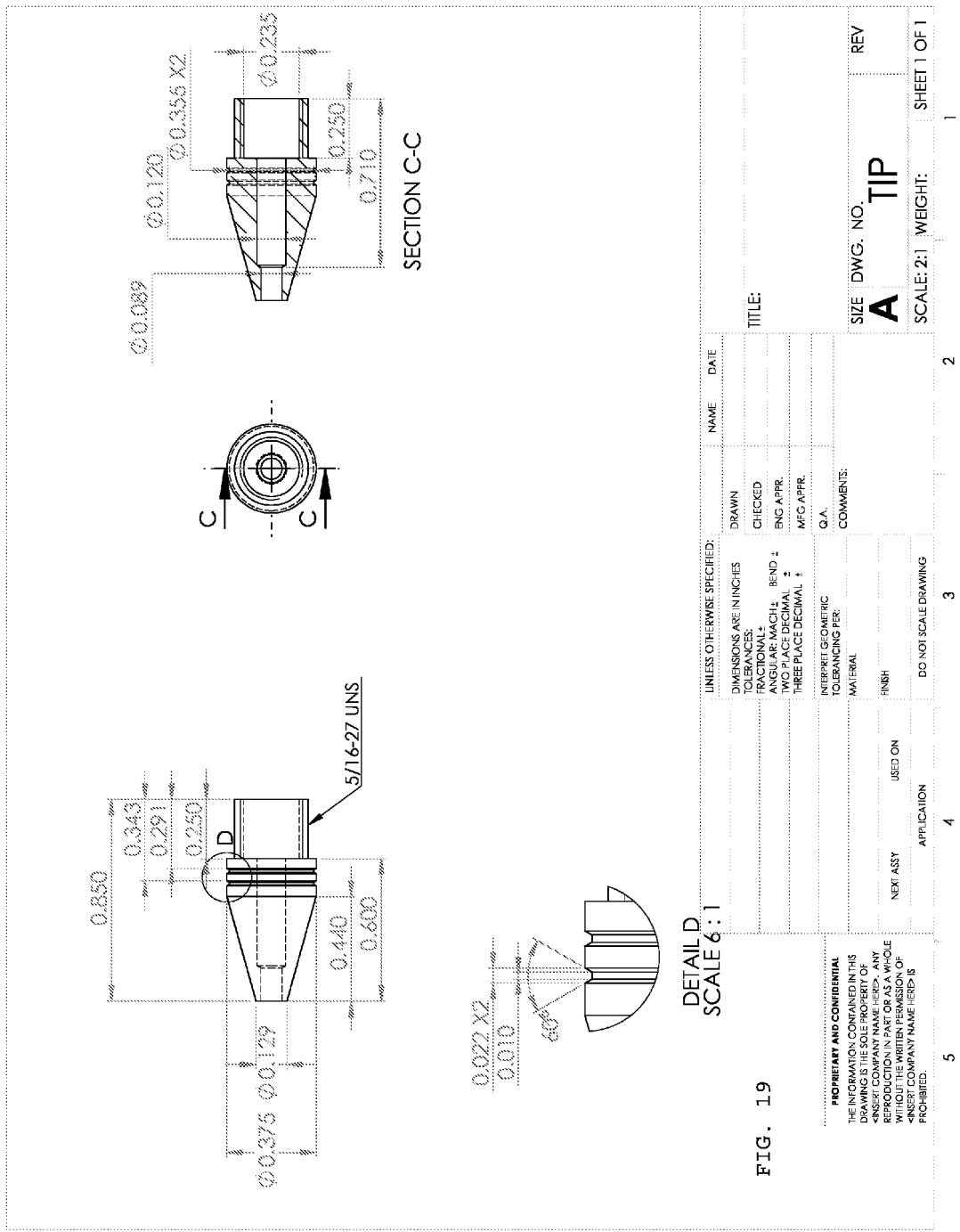
FIG. 19 is an engineering drawing of the tip.
Figure 20:
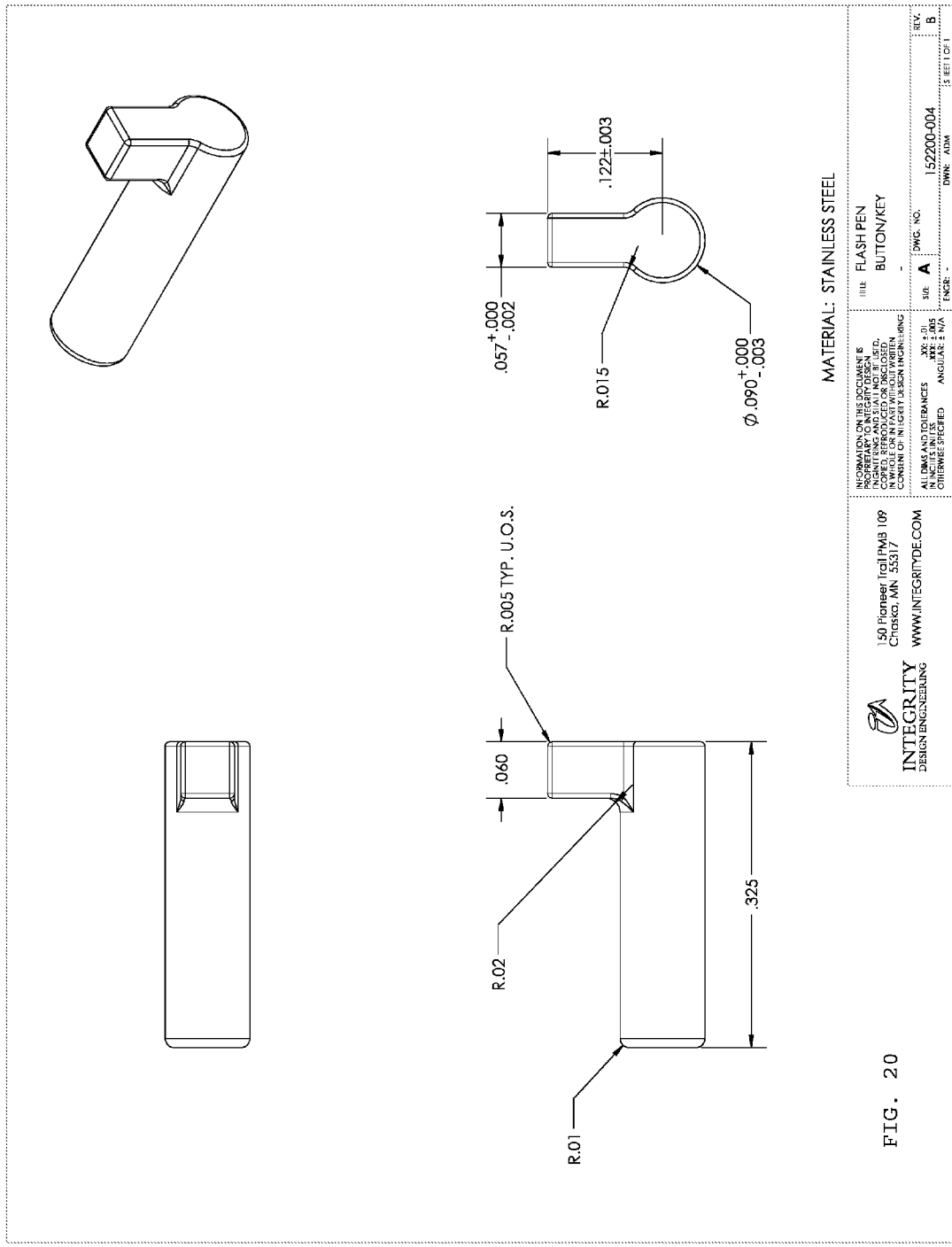
FIG. 20 is an engineering drawing of the release pin/key.

Referring now to FIG. 7, the utensil of FIG. 1 is shown in an exploded view. A through-hole 24 in second utility body 14, with first and second indents 26 and 28 lines up with through-hole 30 in first utility body 12. A hollow slotted axle 31 fits into the through-holes 24 and 30 to secure the two utility body pieces to each other in a hinged fashion. Compression spring 32 fits into the hollow axle. Release pin/button 34 with key/lock 36 slides into the slotted axle, and the key/lock is held into indent 26 by the compression spring 32. Torsion spring 38 is arranged around axle 31, with its ends 40 and 42 normally urging the two utility bodies 12 and 14 apart into the in-line position.

Figure 4:
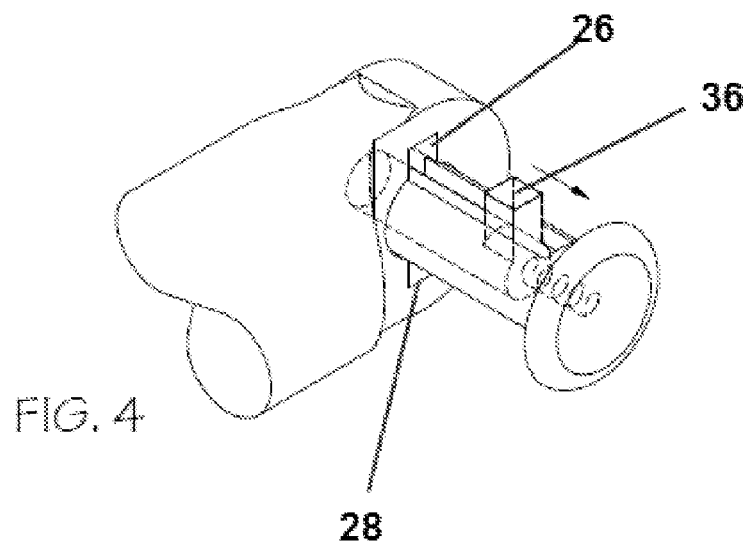
FIG. 4 is a perspective view of an embodiment of the hinge in the folded closed position.
Figure 5:
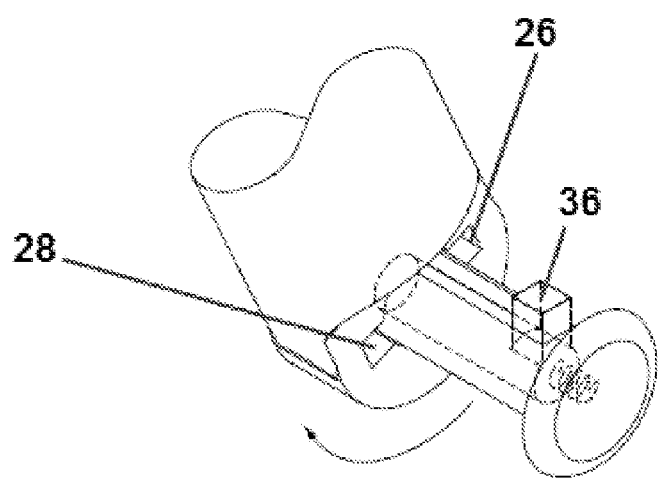
FIG. 5 is a perspective view of an embodiment of the hinge in the mid-opened position.
Figure 6:
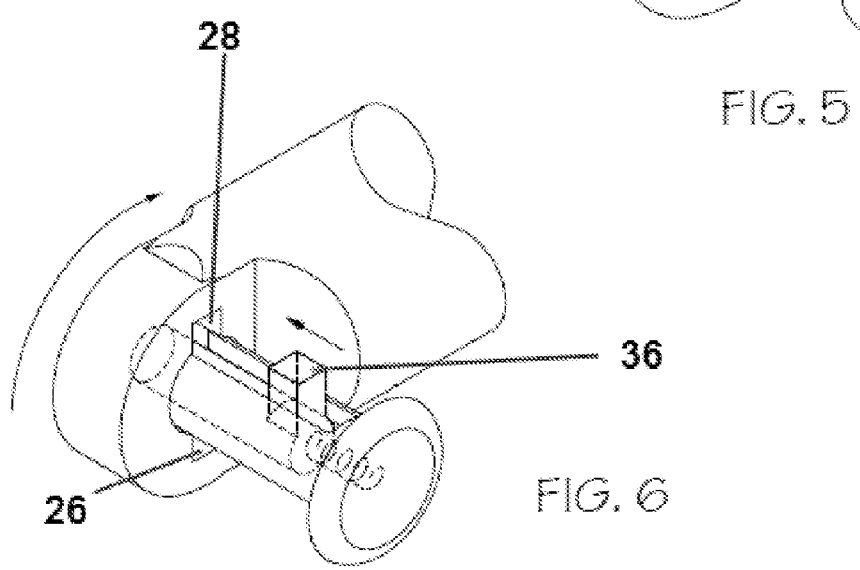
FIG. 6 is a perspective view of an embodiment of the hinge in the opened in-line position.

Referring now to FIGS. 4-6, the hinge is shown in the closed position. To actuate the assisted opening hinge, the end of the release pin/button 34 (left side of FIG. 4, not shown in this view) is pressed, causing the key/lock to slide out of the indent 26, and compressing compression spring 32. With the key/lock 36 removed from indent 26, torsion spring 38 causes the two bodies 12 and 14 to move to the in-line position (FIG. 6), and when the key/lock is lined up with the second indent 28, the compression spring 32 moves the release pin/button 34 back, so the key/lock 36 moves into the second indent 28, to lock the utensil open into the in-line position (22).

FIGS. 8-13 show the embodiment of FIG. 1 in a color solid model view. Gripper slots are located along the outside walls of 12 and 14 (not shown) to ensure user handling, control and comfort.

FIGS. 14-20 are engineering drawings showing dimensions of an embodiment of the invention, and it should be understood that the parts may be of any desired dimensions.

It should also be understood that the parts may be made of any desired metal, alloy, plastic, rubber, wood or any other suitable material desired.

In other embodiments, the torsion spring is replaced with a compression spring, dual torsion spring, barrel torsion spring, plastic spring, wave spring, extension spring, belleville washers, specialty and custom springs, rubber band, nylon band spring, elongating springs, or spring steel. All that is necessary is that the spring provide an urging force to rotate the two bodies 12 and 14 from the folded closed position to the open in-line position.

The shape of the bodies 12 and 14 may be tubular/circular, triangular, square or rectangular, pentagonal, hexagonal or any desired shape. The cavity 16 is shaped to hold the folded body 14 so the utensil takes a very compact size in the closed position.

In the embodiment of FIG. 1, the second utility body 14 houses a pressurized ink cartridge or other removable ink refill cartridge, which is encased in a slightly smaller inner body diameter tube that connects at the pivot point of the main body diameter tube. A threaded or press fit tip 44, connects to the ink body to enable simplistic cartridge refilling, ensuring protection to the pressure filled cartridge such as the Lamy M22 cartridge found in space pens. The pen is opened by rotating the tip 44. In another embodiment the utility body 14 houses a mechanical pencil.

End 19 houses an LED light, but in other embodiments houses a UV blue light for detecting counterfeit bills, an eraser for the mechanical pencil, an eraser for erasable ink or a laser pointer and/or a laser diode, or combinations of these.

The user can actuate the LED light while the device is in the open or closed (compact) position by twisting threaded end cap back and forth to control the on and off function of the LED, or by other means of function control, including but not limited to a button or switch.

The light emitting diodes may be any color, including but not limited to: Bright white, white, soft white, bright blue, soft blue, light blue, as well as red, blue or green lazar diodes and/or UV blue light for use in detection of counterfeit currency.

An engraving flat is designated and located on the backside of 14 available for personal engraving or engraving insert displaying company names, logos, individual/family names or significant date/or events in time, which remains discreet until the utensil is in the open position and engraving is visible.

Figure 21:
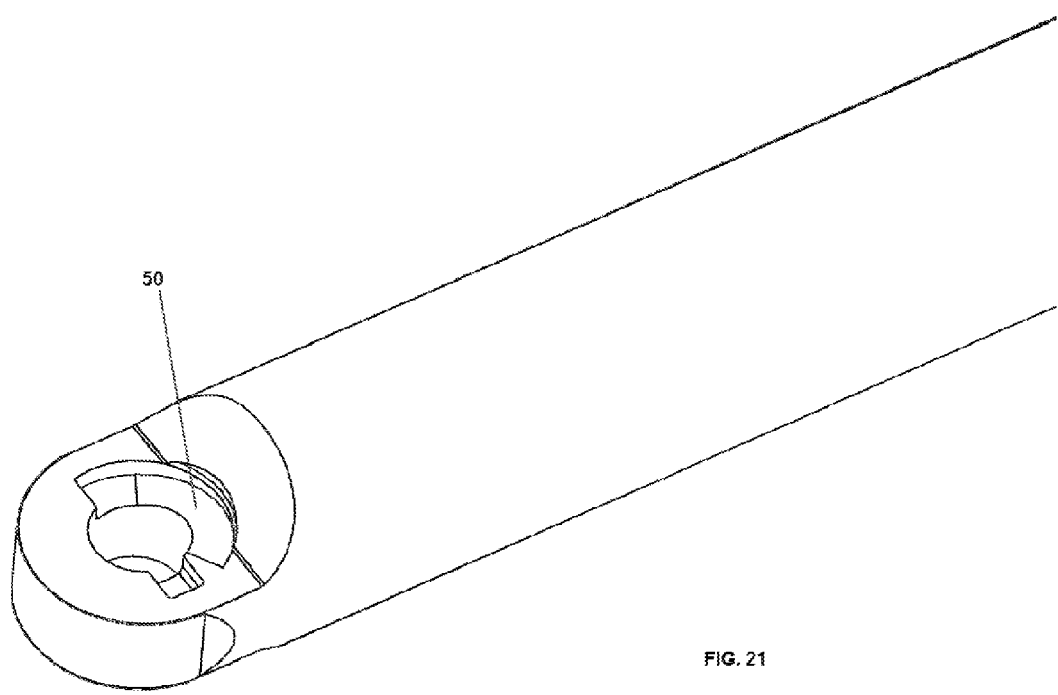
FIG. 21 is another embodiment, in which the release pin does not need to be depressed to unlock the utensil from the open position.
Figure 22:
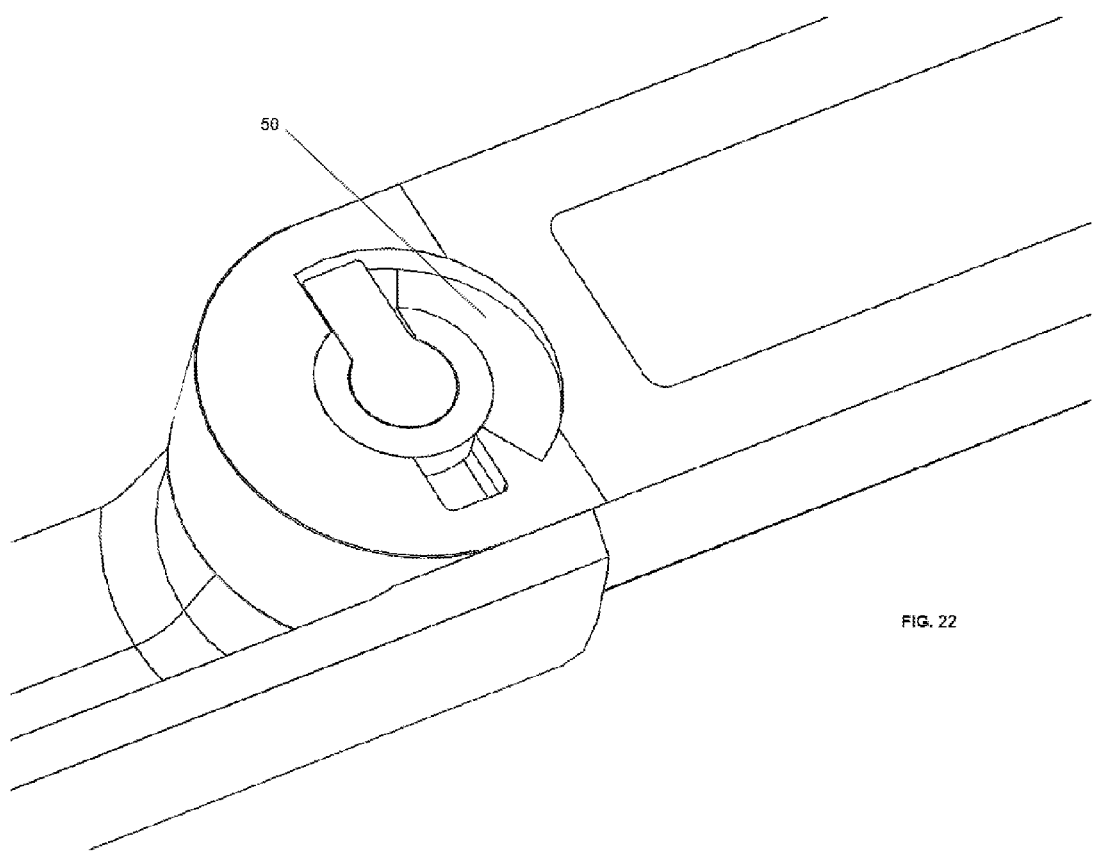
FIG. 22 shows the two bodies of the utensil assembled.
Figure 23:
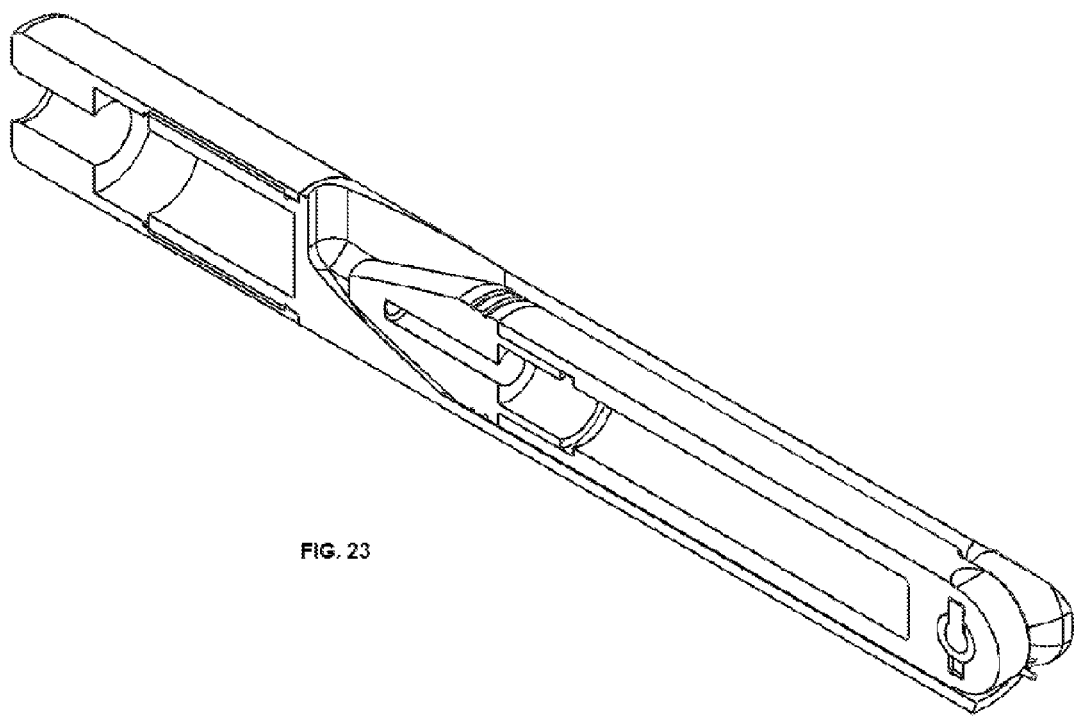
FIG. 23 is a side perspective view (with parts cut away) of the embodiment of FIG. 21, shown in the closed position with the key engaged.
Figure 24:
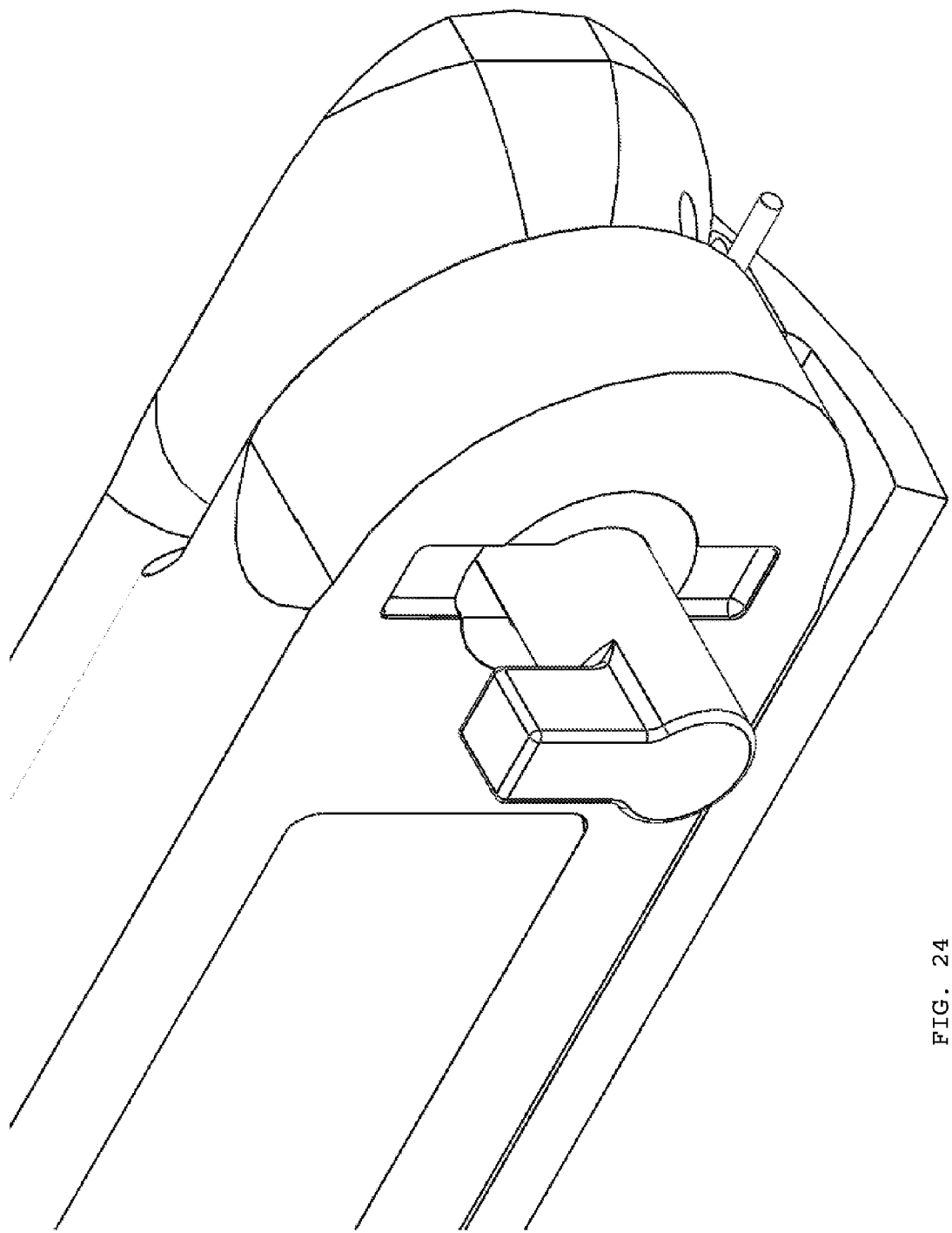
FIG. 24 is a close-up of the hinge end of the embodiment of FIG. 21, shown in the closed position with the key disengaged/actuated.
Figure 25:
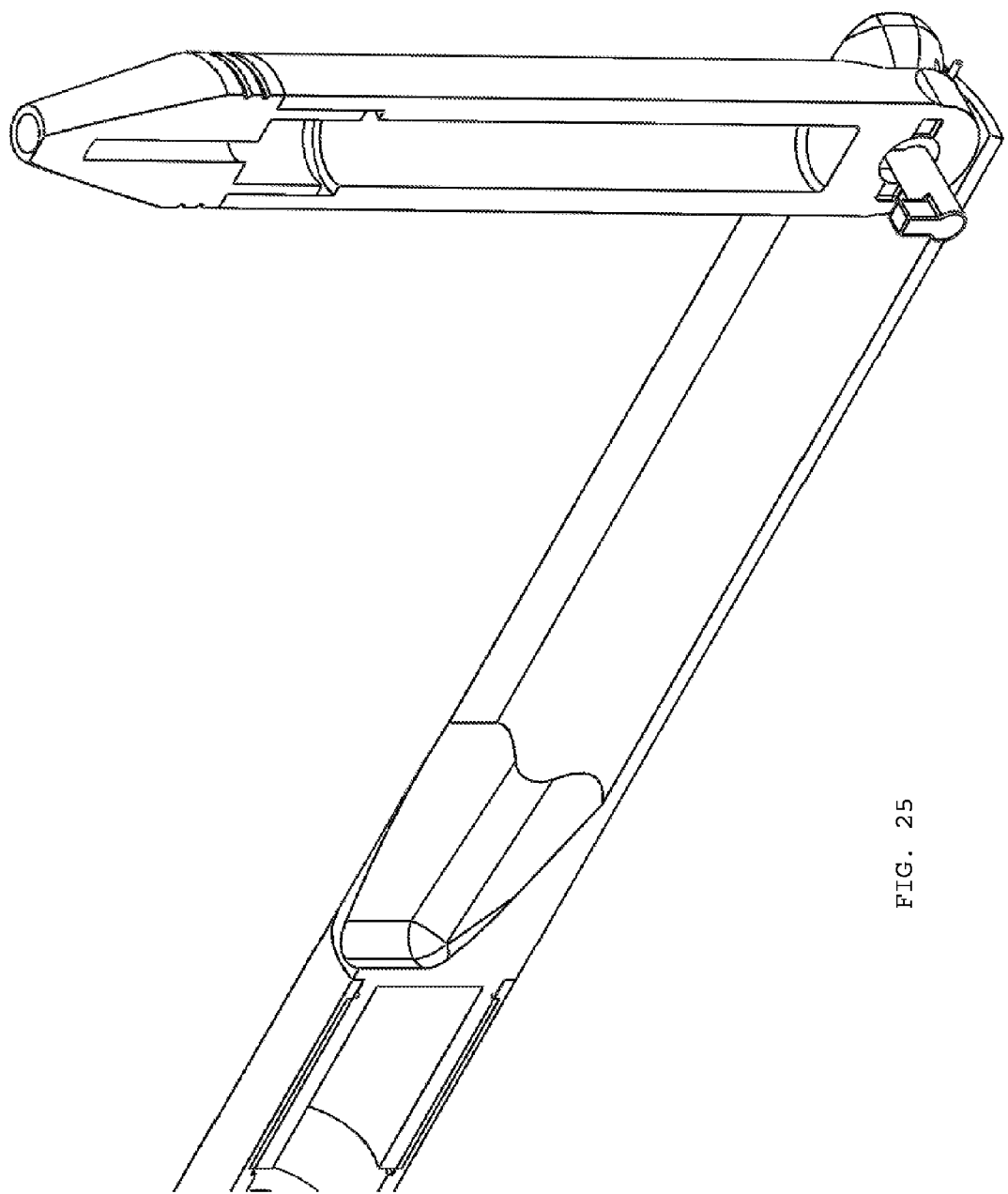
FIG. 25 shows the utensil of FIG. 21 90° open and with the key disengaged, half opened by the spring.
Figure 26:
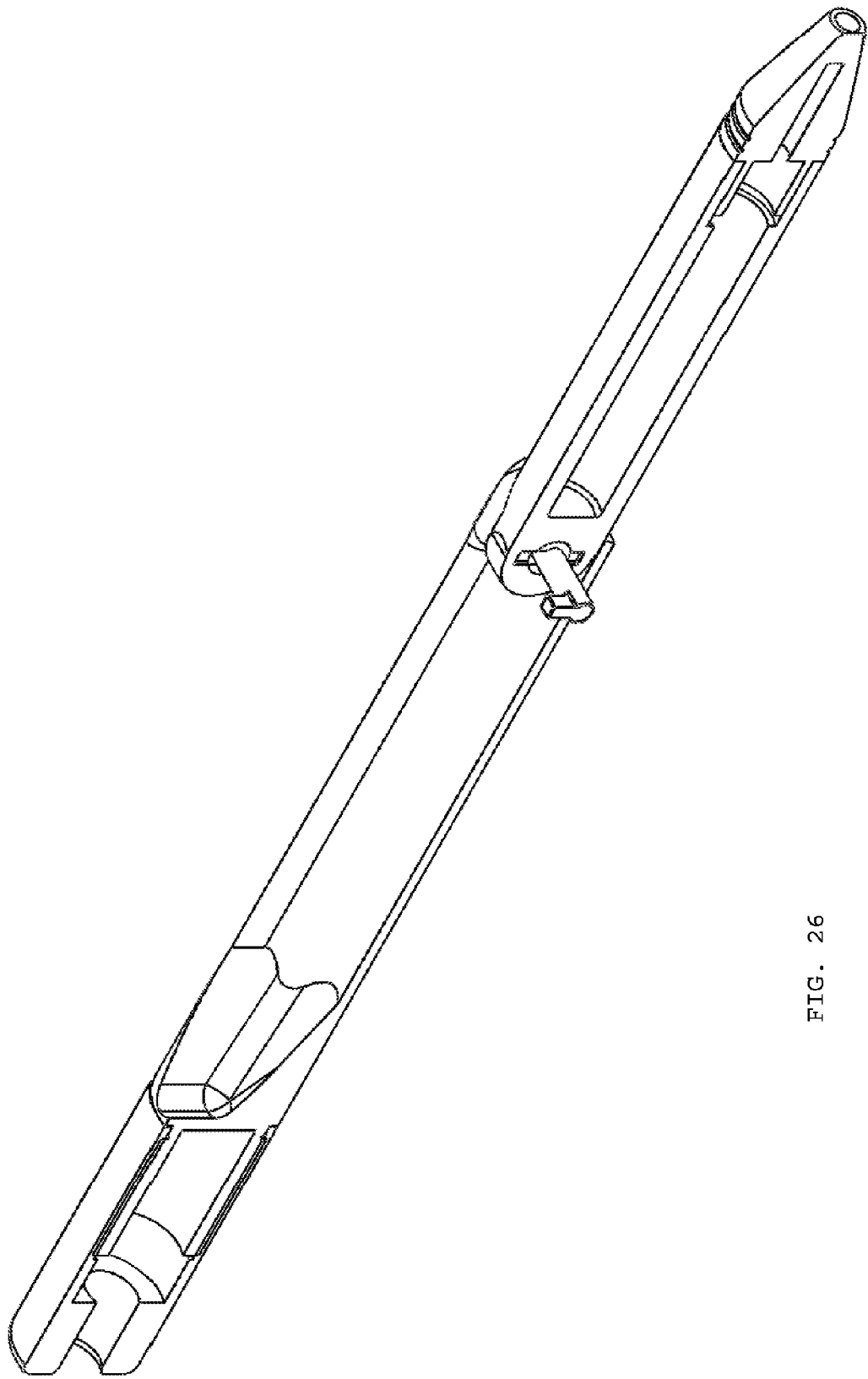
FIG. 26 shows the utensil of FIG. 21 in the fully open position, but with the key still disengaged.
Figure 27:
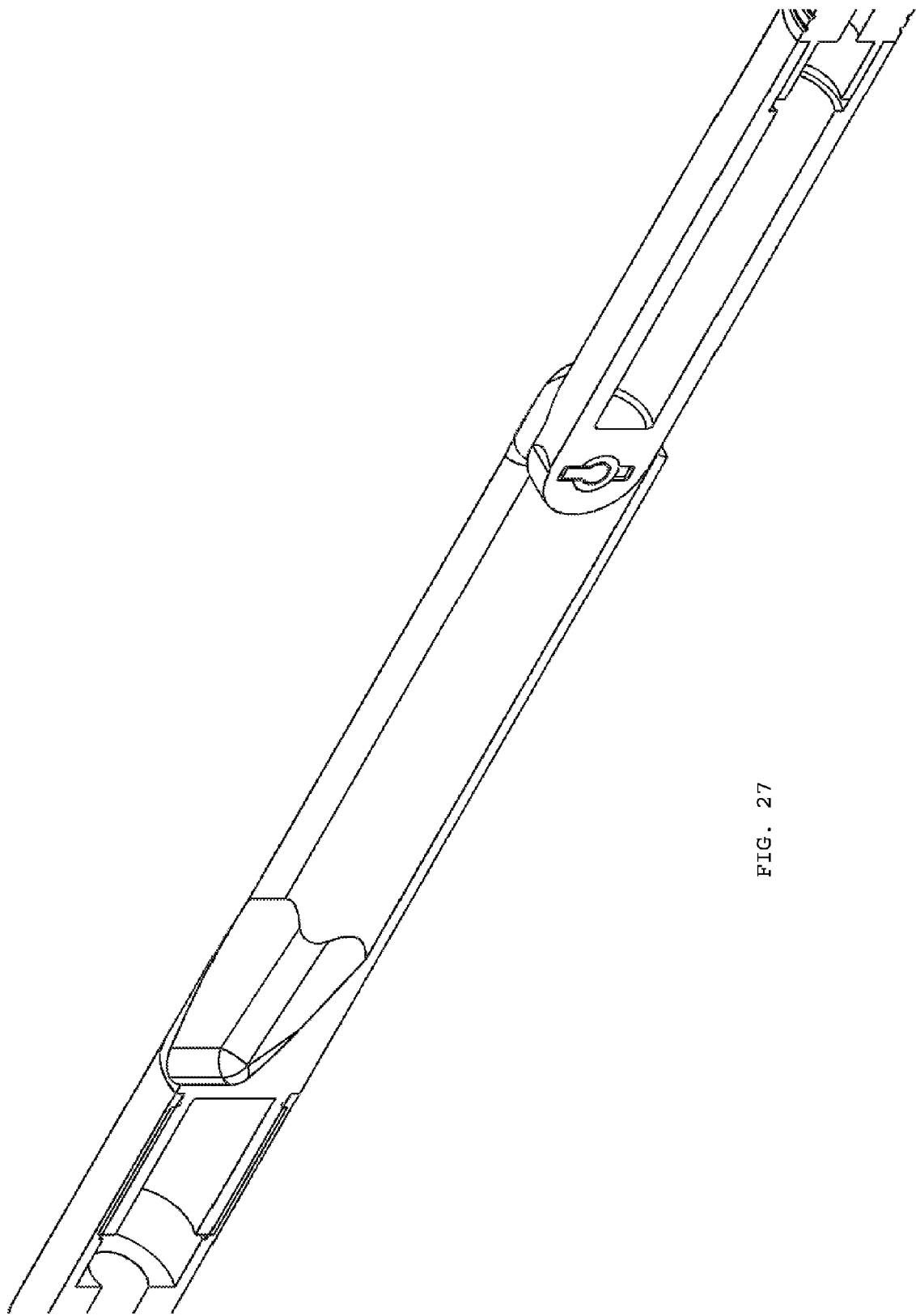
FIG. 27 shows the utensil of FIG. 21 in the fully open position, with the key engaged.
Figure 28:
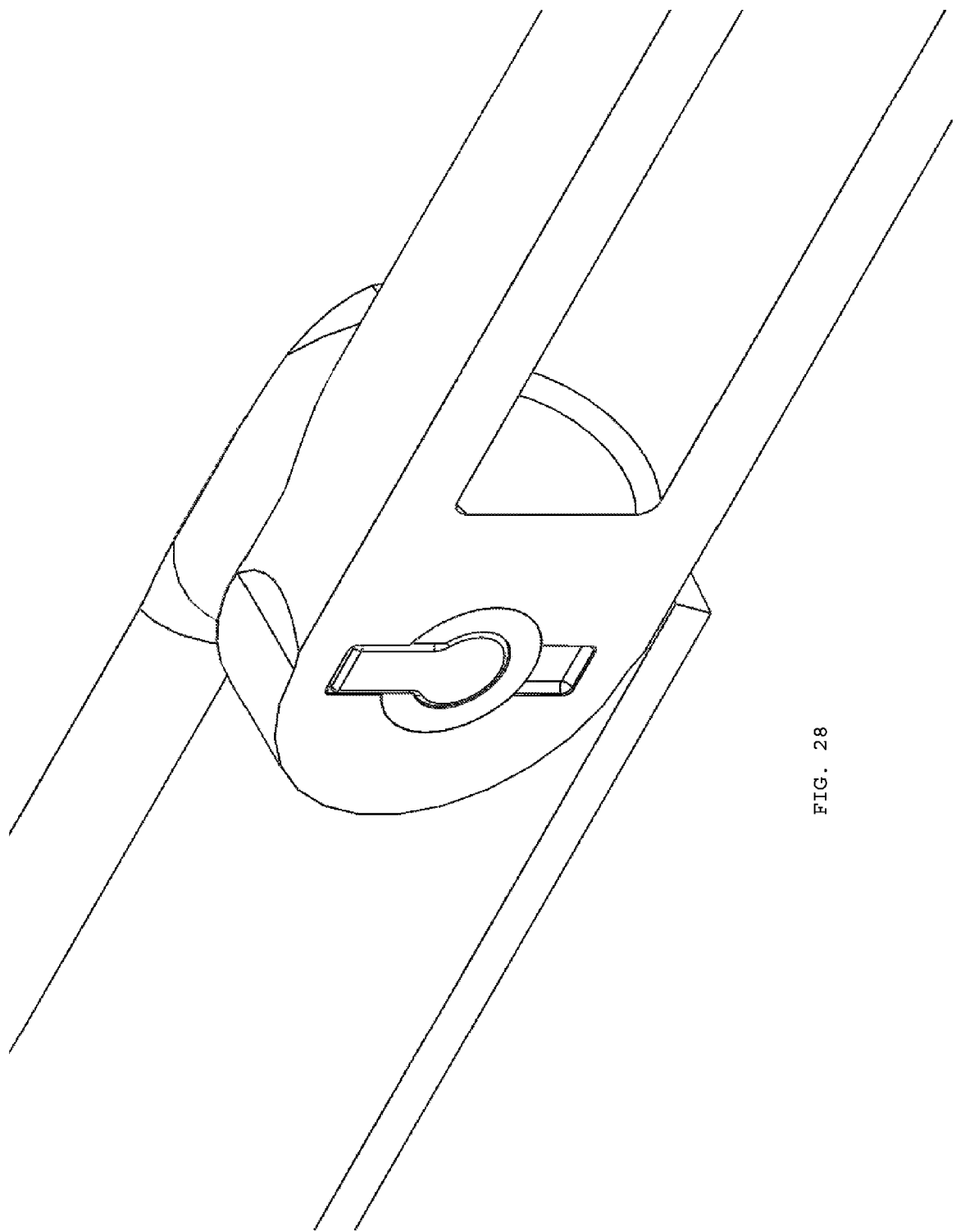
FIG. 28 shows a close-up of the hinge of the utensil of FIG. 21 in the fully open position with the key engaged.

Referring now to FIGS. 21-29, another embodiment of the utensil is shown, in which indent 28 is replaced with a ramped shoulder 50. Ramped shoulder 50 allows the utensil to be closed without pressing release pin 34 to unlock the utensil. Component 14 can simply be rotated by hand, until the lock 36 is pressed into indent 26 by the compression spring 32. FIG. 22 shows the two bodies of the utensil assembled. FIG. 23 is a side perspective view (with parts cut away) of the embodiment of FIG. 21, shown in the closed position with the key engaged. FIG. 24 is a close-up of the hinge end of the embodiment of FIG. 21, shown in the closed position with the key disengaged/actuated. FIG. 25 shows the utensil of FIG. 21 in the 90° open position and with the key disengaged, half opened by the spring. FIG. 26 shows the utensil of FIG. 21 in the fully open position, but with the key still disengaged. FIG. 27 shows the utensil of FIG. 21 in the fully open position, with the key engaged. FIG. 28 shows a close-up of the hinge of the utensil of FIG. 21 in the fully open position with the key engaged.

Figure 29:
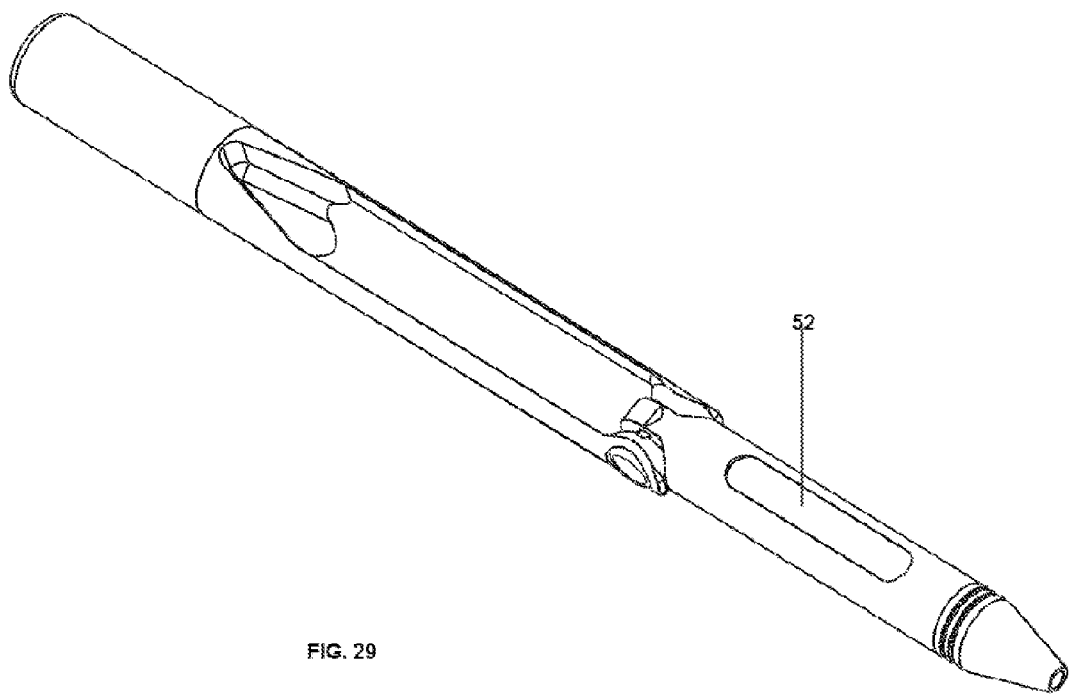
FIG. 29 shows the engraving area.

FIG. 29 shows the engraving area 52, which is hidden in the closed position.

What is claimed is:
1. A utensil comprising:
a first utility component having first and second ends;
a second utility component having first and second ends;
the second end of the first utility component and the first end of the second utility component connected to an assisted opening hinge, the utensil having a folded closed position and an open in-line position, and the assisted opening hinge having an actuated locking device which is physically connected to and part of the assisted opening hinge and which allows the utensil to move between the folded closed position and the open in-line position when actuated.

2. The utensil of claim 1 wherein the assisted opening hinge is comprised of a spring, which when actuated, is constructed and arranged to pivot the first and second utility components from the folded closed position to the in-line position.

3. The utensil of claim 2 wherein the first utility component has an opening into which the second component folds, to place the utensil in a folded closed position.

4. The utensil of claim 3 wherein the actuated locking device holds the utensil in the folded closed position, and when actuated, allows the spring in the assisted opening hinge to open the first and second utility components to the in-line position.

5. The utensil of claim 4 wherein the actuated locking device is comprised of a slotted hollow axle which contains a compression spring which normally forces a release pin lock into a first indent to lock the utensil in the folded closed position, and is constructed and arranged so that when the release pin is depressed, which compresses the compression spring, the release pin lock is moved from the indent, allowing the spring to open the utensil, and when the utensil is in the in-line position, the compression spring moves the release pin lock back into a second indent to lock the utensil into the open position.

6. The utensil of claim 5 wherein the first utility component is a writing utility component and the second utility component is selected from the group consisting of an LED light, a UV blue LED, a laser pointer and an eraser.

7. The utensil of claim 6 wherein the writing utility component is a pen using a pressurized ink cartridge.

8. The utensil of claim 5 wherein the writing utility component is a mechanical pencil.

9. The utensil of claim 6 wherein the second utility component is a combination of both the LED light and the laser pointer.

10. The utensil of claim 2 wherein the spring is selected from the group consisting of a torsion spring, a compression spring, a dual torsion spring, a barrel torsion spring, a plastic spring, a wave spring, an extension spring, a Belleville washer, a rubber band, a nylon band spring, elongating springs, and spring steel.

11. The utensil of claim 1 wherein a cross-section of the first and second utility components is selected from the shape consisting of circular, triangular, rectangular, square, pentagonal and hexagonal.

12. The utensil of claim 4, further including a ramped shoulder which allows the fully open utensil to be closed by rotating the first and second utility components to the closed position.

* * * * *